US012763978B2

(12) United States Patent
Fay et al.

(10) Patent No.: US 12,763,978 B2
(45) Date of Patent: Oct. 13, 2026

(54) DECOMPOSITION OF MASKED VALUES

(71) Applicant: NXP B.V., Eindhoven (NL)

(72) Inventors: Björn Fay, Brande-Hörnerkirchen (DE); Joost Roland Renes, 's-Hertogenbosch (NL); Tobias Schneider, Graz (AT); Olivier Bronchain, Auderghem (BE)

(73) Assignee: NXP B.V., Eindhoven (NL)

( * ) Notice: Subject to any disclaimer, the term of this patent is extended or adjusted under 35 U.S.C. 154(b) by 25 days.

(21) Appl. No.: 19/055,079

(22) Filed: Feb. 17, 2025

(65) Prior Publication Data

US 2025/0286740 A1 Sep. 11, 2025

(30) Foreign Application Priority Data

Mar. 6, 2024 (EP) .................................... 24161824

(51) Int. Cl.
*H04L 9/34* (2006.01)
*H04L 9/32* (2006.01)

(52) U.S. Cl.
CPC .............. *H04L 9/34* (2013.01); *H04L 9/3247* (2013.01)

(58) Field of Classification Search
CPC ....... H04L 9/34; H04L 9/3247; H04L 9/3093; H04L 9/002
(Continued)

(56) References Cited

U.S. PATENT DOCUMENTS 11,416,638 B2 8/2022 Banerjee et al.
12,021,985 B2 6/2024 Azouaoui et al.
(Continued)

OTHER PUBLICATIONS

Barthe, G., BelaÃđ, S., Espitau, T., Fouque, P. A., GrÃ © goire, B., Rossi, M., & Tibouchi, M. (Mar. 2018). Masking the GLP lattice-based signature scheme at any order. In Annual International Conference on the Theory and Applications of Cryptographic Techniques (pp. 354-384). (Year: 2018).*

(Continued)

*Primary Examiner* — Philip J Chea
*Assistant Examiner* — Dorianne Alvarado David

(57) ABSTRACT

The disclosure relates to decomposition of masked values in a cryptographically secure digital signing system. Example embodiments include a method of decomposing mod 44 an N bit Boolean share input ($b'^{B,k}$), where N>12, the method comprising: i) reducing (302-305) a number of bits in the Boolean share input ($b'^{B,k}$) by adding a lower 11:0 bits of the input ($b'^{B,k}$) to an upper portion of the input left shifted by 2 bits to provide a first intermediate result $$(t_1^{B,13})$$

having M bits; ii) reducing (306-309) a number of bits of the first intermediate result $$(t_1^{B,13})$$

by adding a lower 6:0 portion of the intermediate result to an upper portion left shifted by 2 bits and subtracted from a multiple of 44 to provide a second intermediate result $$(t_3^{B,8})$$

(Continued)

and iii) adjusting (310-316) the second intermediate result $$(t_3^{B,8})$$

by adding and/or subtracting 44 to provide an output $$(w_1^{B,k'})$$

having a value within an interval of 0:43, the output $$(w_1^{B,k'})$$

being a mod 44 representation of the input ($b'^{B,k}$).

18 Claims, 5 Drawing Sheets

(58) Field of Classification Search
USPC .......................................................... 713/189
See application file for complete search history.

(56) References Cited

U.S. PATENT DOCUMENTS

| | | | | |
|---|---|---|---|---|
| 2017/0244552 | A1 * | 8/2017 | Thiebeauld De La Crouee | H04L 9/003 |
| 2021/0165633 | A1 * | 6/2021 | Guilley | G06F 7/501 |
| 2022/0012334 | A1 * | 1/2022 | Ghosh | G06F 21/556 |
| 2022/0014363 | A1 * | 1/2022 | Basso | H04L 9/3093 |
| 2022/0337389 | A1 * | 10/2022 | Gourjon | H04L 9/002 |
| 2022/0337398 | A1 * | 10/2022 | Schneider | H04L 9/085 |
| 2023/0091951 | A1 | 3/2023 | Ghosh et al. | |
| 2023/0396436 | A1 * | 12/2023 | Azouaoui | G06F 7/4873 |
| 2024/0015012 | A1 * | 1/2024 | Bronchain | H04L 9/085 |
| 2024/0126511 | A1 * | 4/2024 | Azouaoui | H04L 9/003 |
| 2024/0223354 | A1 * | 7/2024 | Azouaoui | H04L 9/3218 |
| 2024/0250801 | A1 * | 7/2024 | Seo | G09C 1/00 |
| 2024/0275576 | A1 * | 8/2024 | Schoenauer | H04L 9/004 |
| 2024/0338492 | A1 * | 10/2024 | Bronchain | G06F 21/72 |
| 2024/0388433 | A1 * | 11/2024 | Bronchain | H04L 9/3093 |
| 2024/0405986 | A1 * | 12/2024 | Schoenauer | H04L 9/3093 |
| 2024/0422010 | A1 * | 12/2024 | Tan | H04L 9/3218 |
| 2025/0007711 | A1 * | 1/2025 | Bronchain | H04L 9/32 |
| 2025/0080334 | A1 * | 3/2025 | Saarinen | H04L 9/0852 |
| 2025/0080342 | A1 * | 3/2025 | Azouaoui | H04L 9/3247 |
| 2025/0097048 | A1 * | 3/2025 | Renes | H04L 9/3247 |
| 2025/0365131 | A1 * | 11/2025 | Hamburg | H04L 9/0643 |
| 2026/0121834 | A1 * | 4/2026 | Patel | H04L 9/0631 |

OTHER PUBLICATIONS

Bootle, J., Delaplace, C., Espitau, T., Fouque, P. A., & Tibouchi, M. (Oct. 2018). LWE without modular reduction and improved side-channel attacks against BLISS. In International Conference on the Theory and Application of Cryptology and Information Security (pp. 494-524). (Year: 2018).*

Cheng, N., Zhang, F., & Mitrokotsa, A. (Aug. 2023). Efficient three-party boolean-to-arithmetic share conversion. In 2023 20th Annual International Conference on Privacy, Security and Trust (PST) (pp. 1-6). IEEE. (Year: 2023).*

Gorodecky, D., & Villa, T. (Jun. 2019). Efficient implementation of modular division by input bit splitting. In 2019 IEEE 26th Symposium on Computer Arithmetic (ARITH) (pp. 54-60). IEEE Computer Society. (Year: 2019).*

Azouaoui, Melissa et al.; "Protecting Dilithium against Leakage: Revisited Sensitivity Analysis and Improved Implementations"; IACR Cryptology ePrint Archive; Paper 2022/1406; Revised Apr. 12, 2023; https://ia.cr/2022/1406.

Bai, Shi et al.; "Crystals-Dilithium Algorithm Specifications and Supporting Documentation" (Version 3.1); Feb. 8, 2021.

Bronchain, Olivier et al.; "Bitslicing Arithmetic/Boolean Masking Conversions for Fun and Profit with Application to Lattice-Based KEMs"; IACR Cryptology ePrint Archive; Paper 2022/158; Published by the IACR in TCHES 2022; https://ia.cr/2022/158.

Coron, Jean-Sebastien et al.; "High-order masking of NTRU"; IACR Transactions on Cryptographic Hardware and Embedded Systems; vol. 2023, No. 2, 180-211; Published Mar. 6, 2023; DOI:10.46586/tches.v2023.12.180-211.

Coron, Jean-Sebastien et al.; "Improved Gadgets for the High-Order Masking of Dilithium"; Cryptology ePrint Archive, Paper 2023/896; Published by the IACR in TCHES 2023; https://ia.cr/2023/896.

Migliore, Vincent et al.; "Masking Dilithium: Effcient Implementation and Side-Channel Evaluation"; Applied Cryptography and Network Security: 17th International Conference; ACNS 2019; Bogota, Columbia, Jun. 5-7, 2019; https://doi.org/10.1007/978-3-030-21568-2.

National Institute of Standards and Technology; "Post-quantum Cryptography Standardization;" Created Jan. 3, 2017; Updated Jan. 31, 2025; https://csrc.nist.gov/Projects/Post-Quantum-Cryptography/Post-Quantum-Cryptography-Standardization.

Rivain, Matthieu et al.; "Provably Secure Higher-Order Masking of AES"; International Association for Cryptologic Research 2010; CHES 2010, LNCS 6225; 2010.

* cited by examiner

DECOMPOSITION OF MASKED VALUES

CROSS-REFERENCE TO RELATED APPLICATIONS

This application claims the priority under 35 U.S.C. § 119 of European Patent application no. 24161824.8, filed on Mar. 6, 2024, the contents of which are incorporated by reference herein.

FIELD

The disclosure relates to decomposition of masked values in a cryptographically secure digital signing system.

BACKGROUND

Digital security infrastructure relies on a range of efficient and secure cryptographic operations, including symmetric and asymmetric cryptography. Current asymmetric cryptography schemes include RSA and ECC, which are widely used in many applications, for example to enable secure symmetric key exchange and to perform secure digital signing. It is infeasible using conventional computer technology to break such schemes provided that a sufficiently long key is used. A 256-bit key, for example, is in practice unbreakable using brute force methods on any current or future conventional computing means. With the anticipated introduction of quantum computing, however, such schemes could become vulnerable to attack. Further cryptographic standards are therefore being developed that are designed to be resistant to quantum computing algorithms. Recent significant advances in quantum computing have accelerated research into post-quantum cryptography (PQC) schemes, i.e. cryptographic algorithms which run on classical computers but are believed to be still secure even when faced with an adversary having access to a quantum computer.

In 2022, NIST (the National Institute of Standards and Technology) chose Dilithium as the primary PQC digital signature standard for the future. Dilithium is a digital signature scheme that is strongly secure under chosen message attacks based on the hardness of lattice problems over module lattices. As with traditional cryptography, Dilithium provides sufficient "black-box" security, but physical implementations of the standard may still be vulnerable to physical attacks, such as side-channel analysis and fault-injection attacks. While prior work already presents some proposals for dedicated countermeasures for Dilithium against such attacks, the current state of the art is still much less mature compared to traditional cryptography and there is still room for improvement.

SUMMARY

According to a first aspect there is provided a computer-implemented method of decomposing mod 44 an N bit Boolean share input, where N>12, the method comprising:

i) reducing a number of bits in the Boolean share input by adding a lower 11:0 bits of the input to an upper portion of the input left shifted by 2 bits to provide a first intermediate result having M bits;

ii) reducing a number of bits of the first intermediate result by adding a lower 6:0 portion of the intermediate result to an upper portion left shifted by 2 bits and subtracted from a multiple of 44 to provide a second intermediate result; and iii) adjusting the second intermediate result by adding and/or subtracting 44 to provide an output having a value within an interval of 0:43, the output being a mod 44 representation of the input.

The method allows for a more efficient way to compute mod 44 on Boolean shares in a secure system. The method requires only basic bit manipulation such as shifting operations, together with standard Boolean masked addition and subtraction operations. Implementing the method in a digital signature scheme therefore requires minimal overhead and can assist with reducing implementation, code size and verification overhead.

The adding and subtracting operations may be defined as arithmetic addition and subtraction of Boolean share inputs.

Step i) may comprise:

ia) reducing the number of bits in the Boolean share input by adding the lower 11:0 bits of the input to an upper N−1:12 portion of the input left shifted by 2 bits to provide a third intermediate result having P bits, where P<N; and ib) reducing a number of bits in the third intermediate result by adding a lower 11:0 bits of the third intermediate result to an upper P−1:12 portion of the third intermediate result left shifted by 2 bits to provide the first intermediate result.

Step ii) may comprise:

iia) subtracting the first intermediate result from an integer multiple of 44 to provide a fourth intermediate result;

iib) left shifting an upper 6 bits of the fourth intermediate result by two bits and subtracting this from a lower 7 bits of the fourth intermediate result to provide a fifth intermediate result;

iic) adding 44 to the fifth intermediate result from 44 to provide a sixth intermediate result; and iid) subtracting a lower 6 bits of the sixth intermediate result to provide the second intermediate result.

The integer multiple may be 6.

The number N, i.e. the initial number of bits in the N bit Boolean share input, may be 32.

The number of bits in the first intermediate result, M, may be 12.

According to a second aspect there is provided a computer-implemented method of performing a signing operation in a digital signature scheme, the method comprising:

receiving an input to be digitally signed;

performing a digital signing operation on the received input using a secret key; and providing a signature output from the digital signing operation, wherein the step of performing the digital signing operation incorporates the method according to the first aspect.

The digital signature scheme may be Dilithium.

According to a third aspect there is provided a computer system for performing a signing operation in a digital signature scheme, the system configured to:

receive an input to be digitally signed;

perform a digital signing operation on the received input using a secret key; and provide a signature output from the digital signing operation, wherein the system is configured to perform the digital signing operation incorporating decomposing mod 44 an N bit Boolean share input, where N>12, by:

i) reducing a number of bits in the Boolean share input by adding a lower 11:0 bits of the input to an upper portion of the input left shifted by 2 bits to provide a first intermediate result having M bits;

ii) reducing a number of bits of the first intermediate result by adding a lower 6:0 portion of the intermediate result to an upper portion left shifted by 2 bits and subtracted from a multiple of 44 to provide a second intermediate result; and iii) adjusting the second intermediate result by adding and/or subtracting 44 to provide an output having a value within an interval of 0:43, the output being a mod 44 representation of the input.

Step i) may comprise:

ia) reducing the number of bits in the Boolean share input by adding the lower 11:0 bits of the input to an upper N−1:12 portion of the input left shifted by 2 bits to provide a third intermediate result having P bits, where P<N; and ib) reducing a number of bits in the third intermediate result by adding a lower 11:0 bits of the third intermediate result to an upper P−1:12 portion of the third intermediate result left shifted by 2 bits to provide the first intermediate result.

Step ii) may comprise:

iia) subtracting the first intermediate result from an integer multiple of 44 to provide a fourth intermediate result;

iib) left shifting an upper 6 bits of the fourth intermediate result by two bits and subtracting this from a lower 7 bits of the fourth intermediate result to provide a fifth intermediate result;

iic) adding 44 to the fifth intermediate result from 44 to provide a sixth intermediate result; and iid) subtracting a lower 6 bits of the sixth intermediate result to provide the second intermediate result.

The integer multiple may be 6.

N may be 32.

According to a fourth aspect there is provided a computer program comprising instructions to cause a computer processor to perform the method according to the first aspect.

There may be provided a computer program, which when run on a computer, causes the computer to configure any apparatus, including a circuit, controller, sensor, filter, or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software implementation may be an assembly program.

The computer program may be provided on a non-transitory computer readable medium, which may be a physical computer readable medium, such as a disc or a memory device, or may be embodied as a transient signal. Such a transient signal may be a network download, including an internet download.

According to a fifth aspect there is provided a hardware converter configured to decompose mod 44 an N bit Boolean share input, where N>12, the hardware converter comprising:

a first bit reduction module configured to reduce a number of bits in the Boolean share input by adding a lower 11:0 bits of the input to an upper portion of the input left shifted by 2 bits to provide a first intermediate result having M bits;

a second bit reduction module configured to reduce a number of bits of the first intermediate result by adding a lower 6:0 portion of the intermediate result to an upper portion left shifted by 2 bits and subtracted from a multiple of 44 to provide a second intermediate result; and an adjustment module configured to adjust the second intermediate result by adding and/or subtracting 44 to provide an output having a value within an interval of 0:43, the output being a mod 44 representation of the input.

The first bit reduction module may be configured to:

reduce the number of bits in the Boolean share input by adding the lower 11:0 bits of the input to an upper N−1:12 portion of the input left shifted by 2 bits to provide a third intermediate result having P bits, where P<N; and reduce a number of bits in the third intermediate result by adding a lower 11:0 bits of the third intermediate result to an upper P−1:12 portion of the third intermediate result left shifted by 2 bits to provide the first intermediate result.

The second bit reduction module may be configured to:

subtract the first intermediate result from an integer multiple of 44 to provide a fourth intermediate result;

left shift an upper 6 bits of the fourth intermediate result by two bits and subtract this from a lower 7 bits of the fourth intermediate result to provide a fifth intermediate result;

add 44 to the fifth intermediate result from 44 to provide a sixth intermediate result; and subtract a lower 6 bits of the sixth intermediate result to provide the second intermediate result.

The integer multiple may be 6.

The number N, i.e. the initial number of bits in the N bit Boolean share input, may be 32.

The number of bits in the first intermediate result, M, may be 12.

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which.

Figure 1:
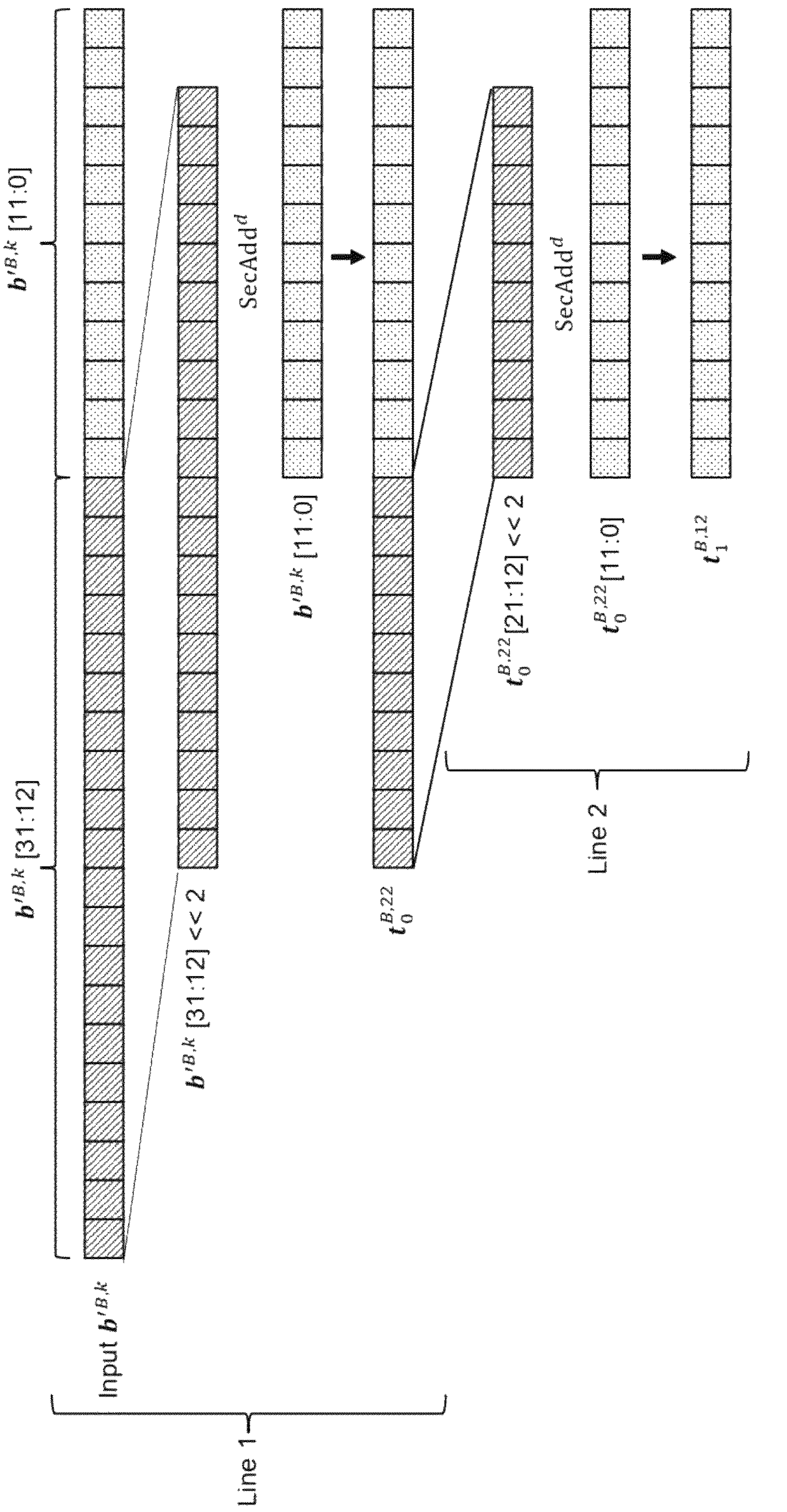
FIG. 1 is a schematic visual representation of a first part of a proposed algorithm for demasking a Boolean masked input mod 44.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments.

DETAILED DESCRIPTION

One critical operation of Dilithium that needs to be protected against attacks relates to the decomposition of masked polynomials. Existing solutions rely on different decomposition approaches for each security level of Dilithium (known as security levels 2, 3 and 5), resulting in higher implementation, code, and verification overhead to support all levels.

The scheme used in Dilithium requires operations involving arithmetic with polynomials having integer coefficients. When implemented, the main computationally expensive operations involve arithmetic operations with polynomials. Such computations are carried out in a ring $R_q=(\mathbb{Z}/q\mathbb{Z})[X]/(X^{256}+1)$, i.e. the ring where polynomial coefficients are in $\mathbb{Z}/q\mathbb{Z}$ and the polynomial arithmetic is performed modulo $X^{256}+1$.

A signing operation of a digital signature scheme generates a signature for a given message using a secret key. If this secret key were to be leaked, it would invalidate the security properties provided by the scheme. It has been shown in [6] that unprotected implementations of Dilithium are vulnerable to implementation attacks, e.g., side-channel analysis. In particular, it has been demonstrated that the secret key can be extracted from physical measurements of key-dependent parts in the signing operation.

For Dilithium, the key-dependent operations include the decomposition of polynomials in a base a. In particular, for a coefficient $a\in\mathbb{Z}/q\mathbb{Z}$, the decompose operation computes the high part $a_1$ and the low part $a_0$ such that a mod $q=a_1\times\alpha+a_0$ with $$-\frac{\alpha}{2} < a_0 \leq \frac{\alpha}{2}$$

except if $$a_1 = \frac{q-1}{\alpha}$$

where $a_1$ is set to 0 and $a_0=(a \bmod q)-q$, with $$-\frac{\alpha}{2} \leq a_0 < 0.$$

The possible values for the decomposition base $\alpha$ are $$\frac{q-1}{16} \text{ and } \frac{q-1}{44}$$

depending on the security level of Dilithium. Additionally, the parameter $\gamma$ is defined such that $\alpha=2\gamma$. While the decomposition operation is trivial in the unmasked case, a secure implementation of this digital signature scheme requires the integration of dedicated countermeasures for this step.

Countermeasures

Masking is a common countermeasure to thwart side-channel analysis and has been utilized for various applications [8]. Besides security, efficiency is also an important aspect when designing a masked algorithm. Important metrics for software implementations of masking are the number of operations and the number of fresh random elements required for the masking scheme.

Decomposition of Masked Polynomials

The first masking approach for Dilithium was proposed in [6] with the decomposition operation for prime modulus performed using multiple arithmetic additions modulus q over Boolean shares. This approach takes as an input an arithmetic sharing of coefficients and produces Boolean-shared decompositions.

Azouaoui et al. [1] proposed an improved approach, which reduced the performance and randomness overhead compared to [6]. For security levels 3 and 5, their method relies on the fact that mod 16 can be efficiently computed on Boolean shares, given that 16=24. For security level 2, however, it is required to compute mod 44 instead, which is not a power of 2. Since this is not straightforwardly possible, Azouaoui et al. propose an alternative solution using a complex masked compression algorithm for this security level. Therefore, to support all security levels, an implementation needs to integrate two quite different decompose approaches.

To overcome this issue, Coron et al. [4] proposed two slightly tweaked decompose algorithms. The first one is based on the compressions approach which is extended to all security levels. The second one is based on the protected mod computation for which they utilize a complete $$SecB2AModp_q^d\left(x^{B,k}\right)$$

conversion. While these indeed work for all security levels, they rely on complex gadgets (compress) and require level-specific variants (e.g., $$SecB2AModp_{16}^d\left(x^{B,k}\right)$$

and $$SecB2AModp_{44}^d\left(x^{B,k}\right)$$

As described above, an implementation of all security levels of Dilithium may use efficient but significantly different approaches for each level [1], rely on complex gadgets which for example require division [4], or may require level-specific variants for each level, which again increases the implementation, code size and verification complexity [4].

A problem with existing solutions is the lack of an efficient method to compute mod 44 on Boolean shares. Such a solution would enable the implementation for level 2 decompose alongside the most efficient level 3 and 5 approach with only minimal changes.

Described herein is a method for computing mod 44 on Boolean shares securely and efficiently. The method does not require a complete $$SecB2AModp_{44}^d\left(x^{B,k}\right)$$

conversion. Instead, the method uses only basic bit manipulation such as a shift operation and standard Boolean masked addition or subtraction gadgets, the latter of which should already be implemented for other masked gadgets according to the Dilithium standard. The implementation overhead of the proposed method is therefore minimal.

Also disclosed is an implementation of how the masked mod gadget may be composed in an improved decompose algorithm, which supports all security levels of Dilithium while only requiring minimal changes between them. Overall, the method helps to reduce the implementation, code size, and verification overhead compared to existing solutions.

In the following, the notation and existing gadgets are introduced, followed by description of an approach to compute mod 44 on Boolean shares, and detailing how this can be used to construct an improved decompose algorithm for masked Dilithium.

Masking Gadgets

Masking protects an intermediate variable x against side-channel attacks by splitting it into d shares and replacing all manipulations on x by manipulations on the d shares. This requires two types of masking, namely arithmetic masking and Boolean masking.

For arithmetic masking, a sensitive variable $x \in \mathbb{Z}_p$ is split into d shares $$x_i^{A_p}$$

$\in \mathbb{Z}_p$, $0 \le i < d$ with $$x = \sum_{i=0}^{d-1} x_i^{A_p} \bmod p.$$

The ensemble of d shares of x is denoted as the arithmetic sharing $$x^{A_p} \in \mathbb{Z}_p^d.$$

Boolean masking enables protection of a k-bit variable x. The ensemble of the d shares of x is denoted as the Boolean sharing $x^{B,k}$ and the i-th share is denoted as $$x_i^{B,k}.$$

The sharing of bits $j_1$ to $j_2$ of x is denoted as $x^{B,k}[j_2:j_1]$. The relation between x and its shares is given as $$x = \bigoplus_{i=0}^{d-1} x_i^{B,k},$$

where $\oplus$ denotes a bitwise exclusive or (XOR).

In the following, the basic gadgets used in the algorithms are briefly described. The method described herein is independent of how these gadgets are implemented, provided the required security properties are fulfilled.

(+,−): Arithmetic addition and subtraction modulo q. A public constant is added only to the first share of an arithmetic sharing, e.g., for $w^{A_q}+\gamma_2$ mod q. For operations on two arithmetic sharings, the operation is applied sharewise, e.g., for $$w^{A_p} - \alpha \cdot w_1^{A_q} \bmod q.$$

(•): Arithmetic multiplication modulo q. A public constant is multiplied to each share of an arithmetic sharing independently, e.g., for $\alpha^{-1} \cdot b^{A_q}$.

x: Boolean shares of a bit are multiplied with a public constant. This can be achieved in multiple ways, for example the bit shares are duplicated and combined via a secure AND function with the public constant.

$$SecA2BModp_q^d(x^{A_q})$$

Converts an arithmetic input sharing $x^{A_q}$ to a Boolean output sharing $x^{B,k}$ with $q<2^k$. There are multiple known approaches, for example disclosed by Bronchain et al. [2].

$$SecB2AModp_q^d(x^{B,k})$$

Converts a Boolean input sharing $x^{B,k}$ to an arithmetic output sharing $x^{A_q}$. There are multiple known approaches, for example disclosed by Bronchain et al. [2].

$$SecCompress_{q,-\alpha^{-1}}^d(x^{A_q})$$

Produces a compressed Boolean sharing $y^{B,k'}$ of the arithmetic input sharing $x^{A_q}$. Azouaoui et al. [1] propose to use this operation to extract, $$w_1^{B,k'}$$

from $w^{A_q}$, in particular to securely divide a given shared input by $-\alpha$.

$$SecUnmask_{k'}^d(x^{B,k})$$

Securely unmasks the Boolean input sharing $x^{B,k}$. There are multiple known approaches, for example from Azouaoui et al. in [1].

$SecAdd^d(x^{B,k}, y^{B,k})$, $SecSub^d(x^{B,k}, y^{B,k})$: Computes arithmetic addition or subtraction of two Boolean input sharing $x^{B,k}$ and $y^{B,k}$.

$$SecAddModp_q^d(x^{B,k}, y^{B,k})$$

Computes arithmetic addition mod q of two Boolean input sharing $x^{B,k}$ and $y^{B,k}$.

The basic building g blocks for the $SecAdd^d(x^{B,k}, y^{B,k})$ and $SecSub^d(x^{B,k}, y^{B,k})$ operations are masked full adders denoted as $SecFullAdder^d$, which is described in Algorithm 1 below. Given two masked input bits $(x^{B,1}, y^{B,1})$ and a masked carry-in $z^{B,1}$, the algorithm securely computes the sum w=x+y+z in a masked fashion, outputting the masked sum bit $w^{B,2}[0]$ and the masked carry-out $w^{B,2}[1]$. The implementations described herein may be independent of the actual instantiation of this gadget. The gadget is required to fulfil the PINI security property and to produce the masked sum bit with zero latency. One such instantiation is given in Algorithm 2 based on the software-oriented implementation, where $$SecAnd_1^d$$

denotes the PINI (Probe Isolating Non-Interference)-secure bitwise AND of two Boolean masked variables $x^{B,k}$ and $y^{B,k}$.

These 1-bit full adders can then be chained to perform an addition of k-bit variables, commonly denoted as a ripple-carry adder. Algorithm 2 represents an exemplary instantiation of such a masked ripple-carry adder $$SecAdd_k^d,$$

which is in line with prior descriptions of such a primitive, e.g., for low security orders. Algorithm 3 represents an exemplary instantiation of a corresponding subtraction operation $$SecSub_k^d.$$

These secure addition and subtraction operations are used in the further algorithms described below.

Algorithm 1 - $SecFullAdder^d$

Input: Boolean sharing $x^{B,1}$, $y^{B,1}$, and $z^{B,1}$.
Output: Boolean sharing $w^{B,2}$ such that $w = x + y + z$.
1: $a^{B,1} \leftarrow x^{B,1} \oplus^B y^{B,1}$
2: $w^{B,2}[0] \leftarrow z^{B,1} \oplus^B a^{B,1}$
3: $w^{B,2}[1] \leftarrow x^{B,1} \oplus^B SecAnd_1^d(a^{B,I}, x^{B,1} \oplus^B z^{B,1})$ ▷ PINI SecAnd

Algorithm 2 - $SecAdd_k^d$

Input: Boolean sharing $x^{B,k}$ and $y^{B,k}$, such that $x, y \in [\![0, 2^k[\![$.
Output: Boolean sharing $z^{B,k}$ such that $z = x + y \bmod 2^k$.
1: $c^{B,1} \leftarrow 0\ (0, 0, \ldots, 0)$
2: for i = 0 to k − 2 do
3: $t^{B,2} \leftarrow SecFullAdder^d(x^{B,k}[i], y^{B,k}[i], c^{B,1})$ ▷ Algorithm 1
4: $(z^{B,k}[i], c^{B,1}) \leftarrow (t^{B,2}[0], t^{B,2}[1])$
5: $z^{B,k}[k-1] \leftarrow x^{B,k}[k-1] \oplus^B y^{B,k}[k-1] \oplus^B c^{B,1}$

Algorithm 3 - $SecSub_k^d$

Input: Boolean sharing $x^{B,k}$ and $y^{B,k}$, such that $x, y \in [\![0, 2^k[\![$.
Output: Boolean sharing $z^{B,k}$ such that $z = x - y \bmod 2^k$.
1: $c^{B,1} \leftarrow (1, 0, \ldots, 0)$
2: for i = 0 to k − 2
3: $t^{B,2} \leftarrow SecFullAdder^d(x^{B,k}[i], y^{B,k}[i], c^{B,1})$ ▷ Algorithm 1

-continued

Algorithm 3 - $SecSub_k^d$

4: $(z^{B,k}[i], c^{B,1}) \leftarrow (t^{B,2}[0], t^{B,2}[1])$
5: $z^{B,k}[k-1] \leftarrow x^{B,k}[k-1] \oplus^B y^{B,k}[k-1] \oplus^B c^{B,1}$ Algorithms 1, 2 and 3 above are described in co-pending U.S. application Ser. No. 18/298,100, filed Apr. 10, 2023, the content of which is incorporated herein by reference.

Decompose Operation

Dilithium requires the computation of a decompose operation that produces a tuple $(w_0, w_1)$ given input w such that $w=\alpha w_1+w_0 \bmod q$. One of the recent proposals from [1] to mask this operation is given in Algorithm 4 below. This takes as input an arithmetic sharing $w^{A_q}$ and returns an arithmetic sharing $$w_0^{A_q}$$

and an unmasked integer $w_1$. The main drawback of this approach is that it requires significantly different implementations for the parameter levels. In particular, NIST Level 2 is built on the complex SecCompress function. This results in increased implementation and code size overhead.

Algorithm 4: $SecDecompose_{q,\alpha}^d(w^{A_q})$(from reference [1])

Input: Arithmetic sharing $w^{A_q}$, prime integer q with $q < 2^k$ integer $\alpha$ with $0 < \alpha < q$ and $\alpha = 2\gamma_2$.
Output: Arithmetic sharing $w_0^{A_q}$ and integer $w_1$ such that
$w = \alpha w_1 + w_0 \bmod q$.
1: if NIST Level 3 or Level 5 then
2: $b^{A_q} \leftarrow w^{A_q} + \gamma_2 \bmod q$
3: $b'^{A_q} \leftarrow \alpha^{-1} \cdot b^{A_q} - 1 \bmod q$
4: $b'^{B,k} \leftarrow SecA2BModp_q^d(b'^{A_q})$
5: $w_1^{B,k'} \leftarrow b'^{B,k}[0:k'-1]$
6: else (NIST Level 2)
7: $w_1^{B,k'} \leftarrow SecCompress_{q,-\alpha^{-1}}^d(w^{A_q})$
8: $w_1 \leftarrow SecUnMask_{k'}^d(w_1^{B,k'})$
9: $w_0^{A_q} \leftarrow w^{A_p} - \alpha \cdot W_1 \bmod q$

New Gadget: SecMod44

The aforementioned issue can be overcome by proposing an efficient and secure approach to compute mod 44 on Boolean shares with standard masking gadgets. An example of this method is described in Algorithm 5 below. The method, termed SecMod44, only requires bit shifts and the standard masking gadgets SecAdd and SecSub, described above. The approach is designed to be implemented in bit-sliced fashion, which allows for efficient operations on bit ranges as necessary. In each range, the effective bit size of the variables decreases, which in effect reduces the complexity of the masked addition and subtraction gadgets. The algorithm works as a sequence of congruences modulo 44, followed by two conditional additions depending on the sign bit of the result. The conditional additions are implemented using the X operations that masks the value by the conditional bit.

In general terms, in each step of the algorithm a relationship is used of the type a) $2^i$ mod 44=$2^j$ or type b) $2^i$ mod 44=44−$2^j$. For mod 44, these relationships include for example $2^{22}$ mod 44=$2^2$, $2^{12}$ mod 44=$2^2$, $2^{17}$ mod 44=44−$2^2$, and $2^7$ mod 44=44−$2^2$. From this it follows that t[n:0]=t[i:0]+t[n:(i+1)]<<j (mod 44) for type a) and t[n:0]=t[i:0]−t[n:(i+1)]<<j (mod 44) for type b). These relationships can therefore be used to more efficiently decompose a Boolean share input mod 44.

Figure 2:
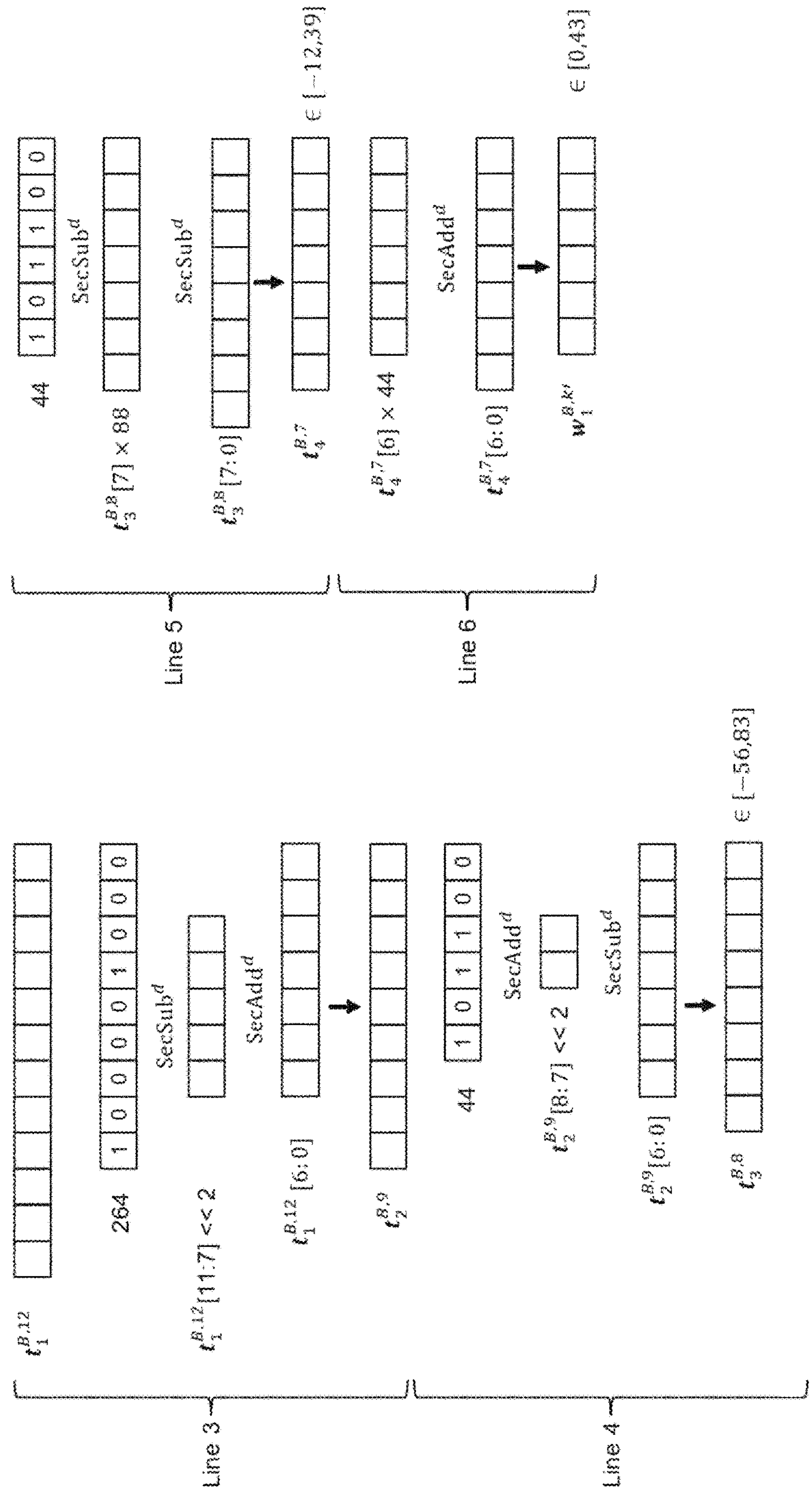
FIG. 2 is a schematic visual representation of a second part of the proposed algorithm.

A graphical representation of the algorithm, using an example of a 32 bit input Boolean share $b'^{B,k}$, is illustrated in FIGS. 1 and 2.

In Lines 1 and 2, illustrated in FIG. 1, the algorithm uses the fact that $2^{12}\equiv 4$ mod 44. As a result, the top 20 bits of the 32 bit Boolean share input, $b'^{B,k}$ [31:12], can be taken and left shifted by two bits, i.e. multiplied by 4, and added to the bottom 12 bits, i.e. $b'^{B,k}$ [11:0] using the $SecAdd^d$ addition operation. After Line 1, only 22 of the remaining bits are non-zero, indicated as $$t_0^{B,22}.$$

In line 2, bits 21:12 of the remaining 22 bits, $$t_0^{B,22}[21:12],$$

are left shifted by two bits, i.e. multiplied by 4, and added to the lower 12 bits, $$t_0^{B,22}[11:0],$$

again with $SecAdd^d$, which results in a further reduction to $$t_1^{B,12}.$$

After Line 2, only 12 bits remain.

In Lines 3 and 4, illustrated in FIG. 2, the congruence $2^7\equiv -4$ mod 44 is used. In Line 3 the top 5 bits of $$t_1^{B,12}, \text{ i.e. } t_1^{B,12}[11:7],$$

are left shifted by 2 bits and subtracted from the bottom 7 bits $$t_1^{B,12}[6:0]$$

using $SecSub_d$. To avoid any borrows, this is done by first subtracting $$t_1^{B,12}[12:7]$$

from 264 (100001000) and adding the (positive) result to the bottom bits.

After Line 3, the result $$t_2^{B,9}$$

is already much reduced to the 9-bit interval [0, 391]. The same congruence $2^7\equiv -4$ mod 44 is then used in Line 4, which now allows borrows and adds 44 so that the result $$t_3^{B,8}$$

is within the interval [−56, 83]. Borrows are not an issue here through using two's complement representation for signed values.

In Line 5 we subtract 44 if the result is positive and add 44 if the result is negative. Afterwards, the result is in the interval [−12, 39]. Finally in line 6, 44 is added $$\text{if } t_4^{B,7}$$

is negative to put the result $$w_1^{B,k'}$$

in the interval [0, 43].

Algorithm 5: $SecMod44^d_{k'}(b'^{B,k})$

Input: Boolean sharing $b'^{B,k}$, prime integer $q = 2^{23} - 2^{13} + 1$ with $q < 2^k$.

Output: Boolean sharing $w_1^{B,k'}$ such that $w_1 = b'$ mod 44.

1: $t_0^{B,22} = SecAdd^d(b'^{B,k}[11:0], b'^{B,k}[31:12] << 2)$

2: $t_1^{B,12} = SecAdd^d(t_0^{B,22}[11:0], t_0^{B,22}[21:12] << 2)$

3: $t_2^{B,9} = SecAdd^d(t_1^{B,12}[6:0], SecSub^d(264, t_1^{B,12}[11:7] << 2))$

4: $t_3^{B,8} = SecSub^d(t_2^{B,9}[6:0], SecAdd^d(44, t_2^{B,9}[8:7] << 2))$

5: $t_4^{B,7} = SecSub^d(t_3^{B,8}[7:0], SecSub^d(44, t_3^{B,8}[7] \times 88))$

6: $w_1^{B,k'} = SecAdd^d(t_4^{B,7}[6:0], t_4^{B,7}[6] \times 44)$

Figure 3:
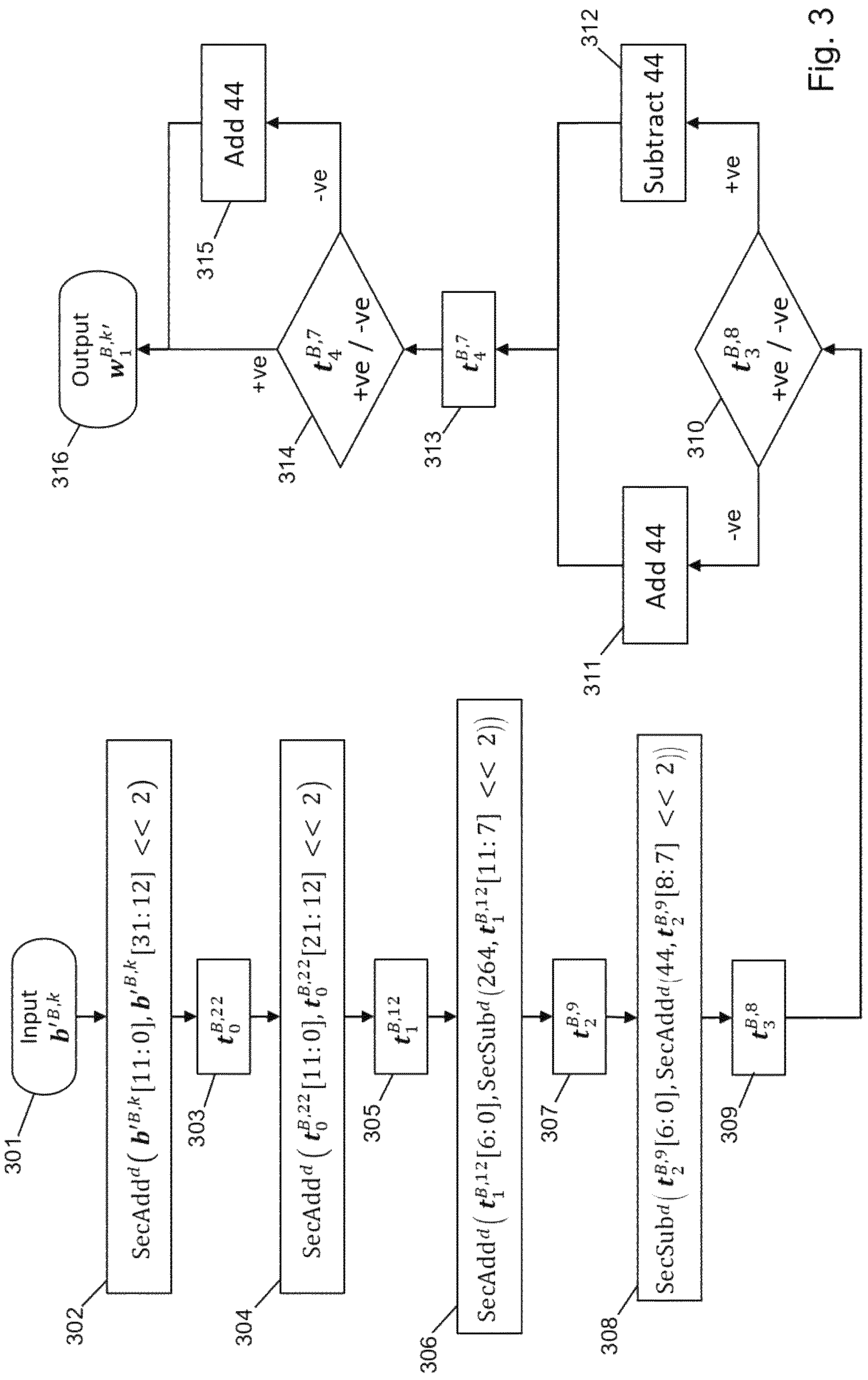
FIG. 3 is a flow diagram illustrating the proposed algorithm.

The flow diagram in FIG. 3 illustrates the above description of the algorithm. The input $b'^{B,k}$ is provided at step 301, which is subjected to the $SecAdd^d$ operation at step 302, corresponding to Line 1, resulting in the 22-bit output $$t_0^{B,22}$$

at step 303. This is subjected to the further $SecAdd_d$ operation at step 304, corresponding to Line 2, resulting in the 13-bit output $t_1^{B,13}$ at step 305. This result is then subjected to the further $\text{SecAdd}^d$ operation at step 306, corresponding to Line 3, resulting in the 9-bit output $t_2^{B,9}$ at step 307. Step 308 then applies the $\text{SecSub}^d$ of Line 4 to further reduce to the 8-bit output $t_3^{B,8}$ at step 309. At step 310, the output $t_3^{B,8}$ is determined to be either positive (+ve) or negative (−ve). If positive, 44 is subtracted at step 312 and if negative 44 is added at step 311, resulting in the 7-bit output $t_4^{B,7}$ at step 313. At step 314, the output $t_4^{B,7}$ is determined to be either positive or negative. If negative, 44 is added at step 315. The output is then the decomposed output $w_1^{B,k'}$ at step 316, which is a mod 44 representation of the input $b'^{B,k}$.

Using the gadget SecMod44, the existing decompose given in Algorithm 4 above can be adapted, resulting in the proposed masked decompose given in Algorithm 6 below. The two possible cases (i.e., levels 3 and 5 and level 2) share most of the operations and only differ in the masked modulo computation.

Although a 32-bit input value is indicated in the example described herein, it should be understood that the method may be applied to inputs having a different number of bits, provided the number of bits is greater than 12. Steps 302 and 304 in effect repeat the same type of process to reduce an initial 32-bit input to a 12-bit intermediate output $t_1^{B,12}$.

In alternative implementations having different numbers of bits in the input value, these steps may be implemented in a single process or more than two steps in order to reduce the initial number of bits to an output having 12 bits.

For levels 3 and 5, an existing approach can be reused using the efficient mod 16 computation on Boolean shares. For level 2, the SecMod44 gadget can be used. Since this can be easily implemented with existing standard gadgets, the improved decompose has a lower implementation and code size complexity than the previous solutions. Azouaoui et al. [1] also propose a slightly modified decompose that does not unmask $w_1$. The proposed algorithm is also compatible with this approach. Line 8 in Algorithm 6 would need to be replaced by a $$SecB2AModp_q^d\left(w_1^{B,k'}\right)$$

conversion, and Line 9 would need to be adapted accordingly to process an arithmetically shared $w_1$.

---

Algorithm 6: SecDecompose - $\text{New}_{q,\alpha}^d\left(w^{A_q}\right)$

---

Input: Arithmetic sharing $w^{A_q}$, prime integer q with $q < 2^k$, integer $\alpha$ with $0 < \alpha < q$ and $a = 2\gamma_2$.

Output: Arithmetic sharing $w_0^{A_q}$, Boolean sharing $w_1^{B,k'}$ such that $w = \alpha w_1 + w_0 \bmod q$.

1: $b^{A_q} \leftarrow w^{A_q} + \gamma_2 \bmod q$
2. $b'^{A_q} \leftarrow \alpha^{-1} \cdot b^{A_q} - 1 \bmod q$
3. $b'^{B,k} \leftarrow \text{SecABModp}_q^d\left(b'^{A_q}\right)$
4. if NIST Level 3 of Level 5 then
5. $w_1^{B,k'} \leftarrow b'^{B,k}[0 : k' - 1]$
6. else (NIST Level 2)
7. $w_1^{B,k'} \leftarrow \text{SecMod44}_k^d\left(b'^{B,k}\right)$
8. $w_1 \leftarrow \text{SecUnMask}_{k'}^d\left(w_1^{B,k'}\right)$
9. $w_0^{A_q} \leftarrow w^{A_q} - \alpha \cdot w_1 \bmod q$

---

Figure 4:
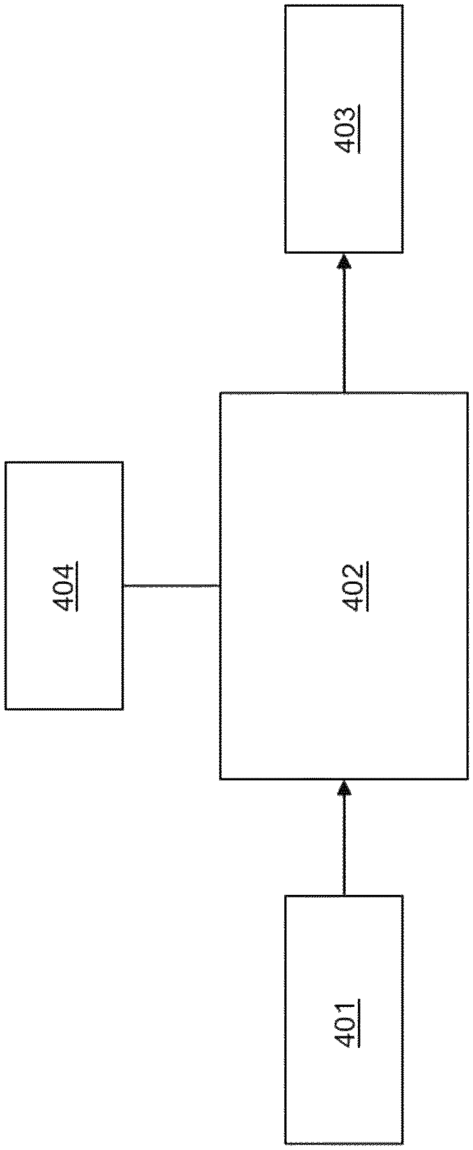
FIG. 4 is a schematic diagram illustrating a system for secure digital signing an input.

FIG. 4 is a schematic diagram illustrating a method of performing a signing operation in a Dilithium digital signature scheme. An input 401 to be digitally signed is received by a hardware digital signing system 402, which may for example be incorporated into an integrated circuit in an article such as a smart card. The digital signing system 402 performs a digital signing operation on the received input 401 using a secret key stored within the system 402. A signature output 403 is provided from the digital signing operation performed by the system 402. An attacker 404 attempting to perform a side-channel attack on the system 402 is unable to extract the secret key from the system 402 due to the use of the digital signature scheme performed, which involves a masking and decomposition process as described herein.

Figure 5:
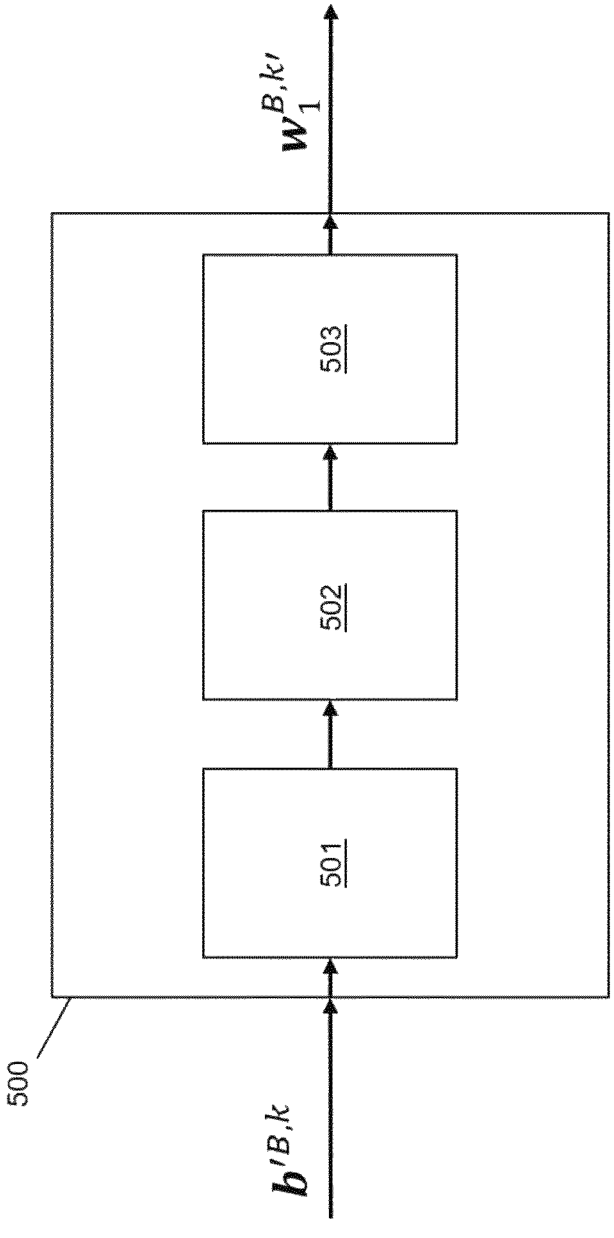
FIG. 5 is a schematic diagram illustrating an example hardware converter for decomposing mod 44 an N bit Boolean share input.

FIG. 5 is a schematic diagram illustrating an example hardware converter 500 configured to decompose mod 44 an N bit Boolean share input $b'^{B,k}$ to provide an output $$w_1^{B,k\prime}.$$

The hardware converter 500 comprises a first bit reduction module 501, a second bit reduction module 502 and an adjustment module 503. The first bit reduction module 501 is configured to reduce a number of bits in the Boolean share input $b'^{B,k}$ by adding a lower 11:0 bits of the input to an upper portion of the input left shifted by 2 bits to provide a first intermediate result having M bits. The second bit reduction module 502 is configured to reduce a number of bits of the first intermediate result by adding a lower 6:0 portion of the intermediate result to an upper portion left shifted by 2 bits and subtracted from a multiple of 44 to provide a second intermediate result. The adjustment module 503 is configured to adjust the second intermediate result by adding and/or subtracting 44 to provide an output $$w_1^{B,k\prime}$$

having a value within an interval of 0:43, the output being a mod 44 representation of the input $b'^{B,k}$. Further optional features of the hardware converter 500 may be described with reference to the corresponding features of the example method as described above.

From reading the present disclosure, other variations and modifications will be apparent to the skilled person. Such variations and modifications may involve equivalent and other features which are already known in the art of cryptographic methods in general and demasking operations in Dilithium in particular, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

REFERENCES

[1] Melissa Azouaoui et al, "Protecting dilithium against leakage: Revisited sensitivity analysis and improved implementations", IACR Cryptol. ePrint Arch. (2022), 1406.

[2] Olivier Bronchain and Gaëtan Cassiers, "Bitslicing arithmetic/boolean masking conversions for fun and profit with application to lattice-based kems", IACR Trans. Cryptogr. Hardw. Embed. Syst. 2022 (2022), no. 4, 553-588.

[3] Jean-Sébastien Coron et al, "High-order masking of ntru", IACR Transactions on Cryptographic Hardware and Embedded Systems 2023 (2023), no. 2, 180-211.

[4] Jean-Sébastien Coron et al, "Improved gadgets for the high-order masking of dilithium", Cryptology ePrint Archive, Paper 2023/896, 2023, https://eprint.iacr.org/2023/896.

[5] L. Ducas et al, Crystals-dilithium algorithm specifications and supporting documentation (version 3.1), 2021.

[6] Vincent Migliore et al, "Masking dilithium-efficient implementation and side-channel evaluation", Applied Cryptography and Network Security-17th International Conference, ACNS 2019, Bogota, Colombia, Jun. 5-7, 2019, Proceedings (Robert H. Deng, Valérie Gauthier-Umaña, Martín Ochoa, and Moti Yung, eds.), Lecture Notes in Computer Science, vol. 11464, Springer, 2019, pp. 344-362.

[7] National Institute of Standards and Technology, Post-quantum cryptography standardization. https://csrc.nist.gov/Projects/Post-Quantum-Cryptography/Post-Quantum-Cryptography-Standardization.

[8] Matthieu Rivain and Emmanuel Prouff, "Provably secure higher-order masking of AES, Cryptographic Hardware and Embedded Systems", CHES 2010, 12th International Workshop, Santa Barbara, CA, USA, Aug. 17-20, 2010. Proceedings (Stefan Mangard and François-Xavier Standaert, eds.), Lecture Notes in Computer Science, vol. 6225, Springer, 2010, pp. 413-427.

The invention claimed is:

1. A hardware converter configured to decompose, using a mod 44 operation, an N bit Boolean share input, where N>12, the hardware converter further configured to:

reduce a number of bits in the N-bit Boolean share input by adding a lower 11:0 bits of the N-bit Boolean share input to an upper portion of the N-bit Boolean input, which is left-shifted by 2 bits, to produce a first intermediate result having M bits;

reduce a number of bits of the first intermediate result by adding a lower 6:0 portion of the intermediate result to an upper portion left shifted by 2 bits and subtracted from a multiple of 44 to provide a second intermediate result;

adjust the second intermediate result by adding or subtracting 44 to provide an output having a value within an interval of 0:43, the output being a mod 44 representation of the N bit Boolean share input; and generate a digital signature based on a digital signature operation using the output and a secret key.

2. The hardware converter of claim 1, further configured to:

reduce the number of bits in the Boolean share input by adding the lower 11:0 bits of the input to an upper N−1:12 portion of the input left shifted by 2 bits to provide a third intermediate result having P bits, where P<N; and reduce a number of bits in the third intermediate result by adding a lower 11:0 bits of the third intermediate result to an upper P−1:12 portion of the third intermediate result left shifted by 2 bits to provide the first intermediate result.

3. The hardware converter of claim 1, further configured to:

subtract the first intermediate result from an integer multiple of 44 to provide a fourth intermediate result;

left shift an upper 6 bits of the fourth intermediate result by two bits and subtract this from a lower 7 bits of the fourth intermediate result to provide a fifth intermediate result;

add 44 to the fifth intermediate result from 44 to provide a sixth intermediate result; and subtract a lower 6 bits of the sixth intermediate result to provide the second intermediate result.

4. The hardware converter of claim 3, wherein the integer multiple is 6.

5. The hardware converter of claim 1, wherein N=32.

6. The hardware converter of claim 1, wherein M=12.

7. A method of decomposing, using a mod 44 operation, an N bit Boolean share input, where N>12, the method comprising:

reducing a number of bits in the N bit Boolean share input by adding a lower 11:0 bits of the input to an upper portion of the input left shifted by 2 bits to provide a first intermediate result having M bits;

reducing a number of bits of the first intermediate result by adding a lower 6:0 portion of the intermediate result to an upper portion left shifted by 2 bits and subtracted from a multiple of 44 to provide a second intermediate result;

adjusting the second intermediate result by adding and/or subtracting 44 to provide an output having a value within an interval of 0:43, the output being a mod 44 representation of the N bit Boolean share input; and generating a digital signature based on a digital signature operation using the output and a secret key.

8. The method of claim 7, wherein reducing the number of bits in the N bit Boolean share input comprises:

reducing the number of bits in the N bit Boolean share input by adding the lower 11:0 bits of the input to an upper N−1:12 portion of the N bit Boolean share input left shifted by 2 bits to provide a third intermediate result having P bits, where P<N; and reducing a number of bits in the third intermediate result by adding a lower 11:0 bits of the third intermediate result to an upper P−1:12 portion of the third intermediate result left shifted by 2 bits to provide the first intermediate result.

9. The method of claim 7, wherein reducing the number of bits of the first intermediate result comprises:

subtracting the first intermediate result from an integer multiple of 44 to provide a fourth intermediate result;

left shifting an upper 6 bits of the fourth intermediate result by two bits and subtracting this from a lower 7 bits of the fourth intermediate result to provide a fifth intermediate result;

adding 44 to the fifth intermediate result from 44 to provide a sixth intermediate result; and subtracting a lower 6 bits of the sixth intermediate result to provide the second intermediate result.

10. The method of claim 9, wherein the integer multiple is 6.

11. The method of claim 7, wherein N=32.

12. The method of claim 7, wherein M=12.

13. The method of claim 7, wherein the digital signature operation is a Dilithium digital signature operation.

14. A non-transitory computer readable medium storing processor-readable instructions that, when executed, cause a processor to decompose, using mod 44 operation, an N bit Boolean share input, where N>12, the non-transitory computer readable medium storing comprising the processor-readable instructions that cause the processor to:

reduce a number of bits in the N bit Boolean share input by adding a lower 11:0 bits of the input to an upper portion of the input left shifted by 2 bits to provide a first intermediate result having M bits;

reduce a number of bits of the first intermediate result by adding a lower 6:0 portion of the intermediate result to an upper portion left shifted by 2 bits and subtracted from a multiple of 44 to provide a second intermediate result;

adjust the second intermediate result by adding or subtracting 44 to provide an output having a value within an interval of 0:43, the output being a mod 44 representation of the N bit Boolean share input; and generate a digital signature based on a digital signature operation using the output and a secret key.

15. The non-transitory computer readable medium of claim 14, wherein the processor-readable instructions that cause the processor to reduce a number of bits comprises processor-readable instructions that cause the processor to:

reduce the number of bits in the N bit Boolean share input by adding the lower 11:0 bits of the input to an upper N−1:12 portion of the N bit Boolean share input left shifted by 2 bits to provide a third intermediate result having P bits, where P<N; and reduce a number of bits in the third intermediate result by adding a lower 11:0 bits of the third intermediate result to an upper P−1:12 portion of the third intermediate result left shifted by 2 bits to provide the first intermediate result.

16. The non-transitory computer readable medium of claim 14, wherein the processor-readable instructions that cause the processor to reduce the number of bits of the first intermediate result comprises processor-readable instructions that cause the processor:

subtract the first intermediate result from an integer multiple of 44 to provide a fourth intermediate result;

left shift an upper 6 bits of the fourth intermediate result by two bits and subtracting this from a lower 7 bits of the fourth intermediate result to provide a fifth intermediate result;

add 44 to the fifth intermediate result from 44 to provide a sixth intermediate result; and subtract a lower 6 bits of the sixth intermediate result to provide the second intermediate result.

17. The non-transitory computer readable medium of claim 16, wherein the integer multiple is 6.

18. The non-transitory computer readable medium of claim 14, wherein N=32.

* * * * *